Aug. 12, 1952  R. L. JAESCHKE  2,606,948
MAGNETIC POLE
Filed Nov. 1, 1950  2 SHEETS—SHEET 1
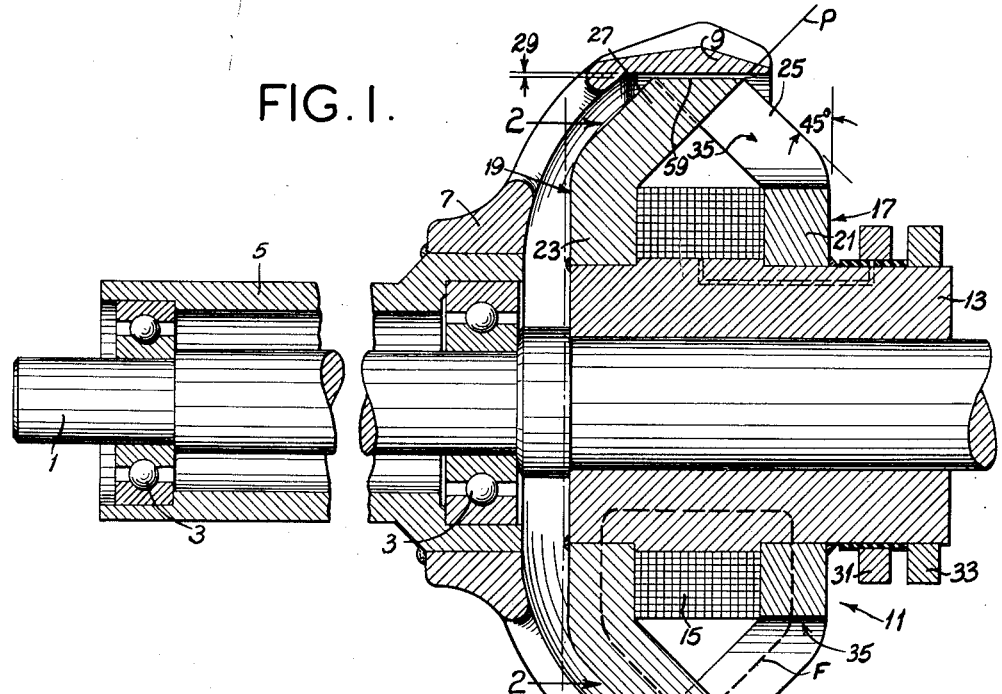
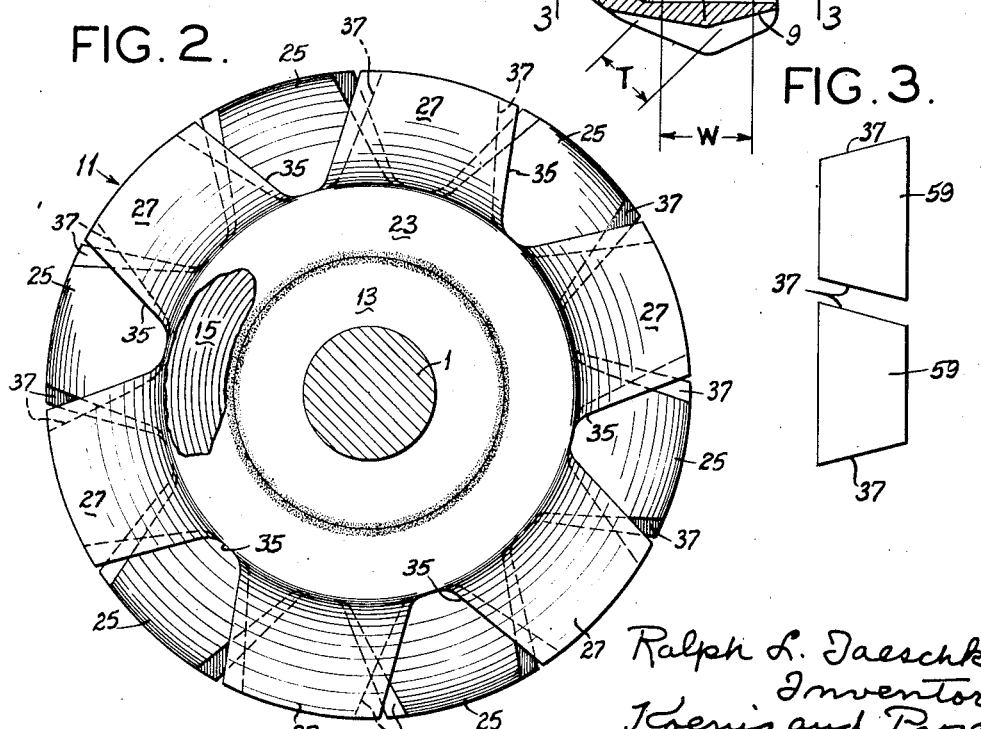
Ralph L. Jaeschke
Inventor
Koenig and Pope
Attorneys Aug. 12, 1952   R. L. JAESCHKE   2,606,948
MAGNETIC POLE Filed Nov. 1, 1950   2 SHEETS—SHEET 2

Ralph L. Jaeschke,
Inventor.
Koenig and Pope,
Attorneys.

Patented Aug. 12, 1952

2,606,948

UNITED STATES PATENT OFFICE 2,606,948

MAGNETIC POLE

Ralph L. Jaeschke, Kenosha, Wis., assignor to Dynamatic Corporation, Kenosha, Wis., a corporation of Delaware Application November 1, 1950, Serial No. 193,417

3 Claims. (Cl. 172—284)

This invention relates to magnetic poles for eddy-current dynamoelectric machines, including clutches, brakes, dynamometers and the like. The invention is an improvement upon apparatus such as shown in Patent 2,470,596.

Among the several objects of the invention are to produce an efficient low-cost field member particularly for use in small-sized dynamoelectric machines, although the invention is not limited to this class of apparatus.

Briefly, the invention comprises pole spiders having interdigitated polar teeth which are primarily stamped and cold pressed from heavy ferrous (steel or iron) sheets. The shapes of the spiders are adapted for minimum flux leakage between poles, minimum magneto-motive force required to force magnetic flux across the air gap, and minimum magnetic pull-over during operation, without loss of efficiency of coupling and without the introduction of undue complications in stamping and forming the spiders. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a longitudinal section of a slip clutch embodying one form of the invention;

Fig. 2 is a cross section taken on line 2—2 of Fig. 1, but showing the field member only;

Fig. 3 is a developed view of certain pole faces viewed on line 3—3 of Fig. 1;

Figure 5:
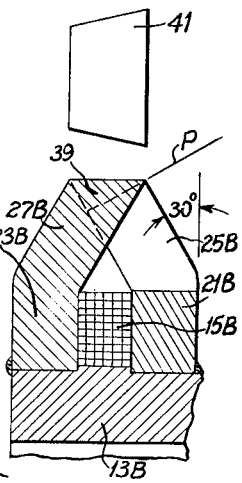
Figure 6:
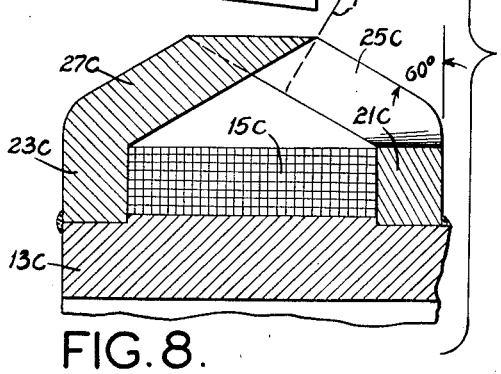
Figure 7:
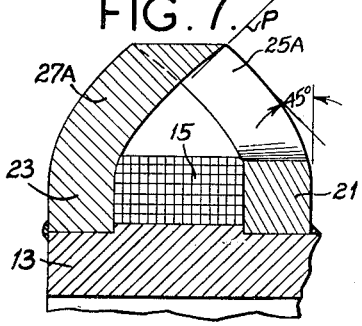
Figure 8:
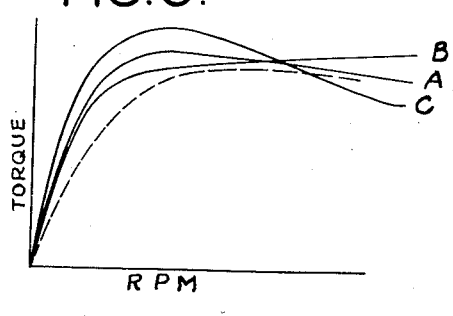

Bracketed Fig. 5 shows at the bottom of the bracket a fragmentary cross section of an alternative form of the invention and at the top a projected view of the corresponding pole face;

Bracketed Fig. 6 shows at the bottom of the bracket a fragmentary cross section of another form of the invention and at the top a projected view of the corresponding pole face;

Fig. 7 is a fragmentary cross section showing another form of the invention; and Fig. 8 is a plot of certain torque-speed relationships discussed below.

Similar reference characters indicate corresponding parts throughout the several views of the drawings.

Referring now more particularly to Fig. 1, there is shown at numeral 1 a drive shaft supported upon bearings 3 and located within a driven quill 5. It is to be understood that the driving and driven relationship between members 1 and 5 may be reversed, this constituting a simple inversion. The driven quill 5 supports an inductor member 7, which includes a magnetizable ferrous (iron or steel) drum portion 9 in which eddy currents may flow.

The shaft 1 carries a field member shown generally at 11. This comprises a magnetizable (iron or steel) sleeve 13 around which is wound an annular field coil 15, flanked by two magnetizable (iron or steel) spiders 17 and 19. These are welded to the sleeve 13. The spiders 17 and 19 are composed of pole rings 21 and 23, respectively, welded to the sleeve 13. Extending from the pole rings 21 and 23 are interdigitated polar teeth 25 and 27, respectively.

The spiders 17 and 19 are, for example, stamped from flat heavy steel sheets, say ½-inch thick for a field member 5 inches in diameter. After stamping the teeth 25, or 27 as the case may be, are bent by a forming operation in a press. The teeth are then trimmed on their sides to the shapes explained below. After assembly on the sleeve 13 and around the coil 15, which assembly interdigitates teeth 25 and 27, the outer ends of the teeth 25 and 27 are cylindrically machined so as to provide a small air gap 29 between the field member 11 and the inductor drum 9. This gap should be as small as possible and is, for example, .020 inch. The smaller the gap is, the less magneto-motive force is required to force flux across it, but the more damaging any usual magnetic pull-over effect (due to slight eccentricity) has between the field member 11 and the inductor 9. It is therefore important that the pull-over effect be minimized.

Current is supplied to the coil 15 through a collector ring 31, the circuit being completed through a grounding collector ring 33. When the coil 15 is excited, a toroidal flux field such as shown at F is produced, which loops the coil 15, passing through the sleeve 13 and, for example, out through ring 21, teeth 25 (which become north), across gap 29 into drum 9 thence back through the gap 29 into teeth 27 (which become south), returning to the sleeve 13. If the shaft 1 be then driven, the resulting north and south poles constituted by the teeth 25 and 27 sweep through the inductor 9, causing eddy currents therein which generate a reactive magnetic field, causing a driving action between the field 11 and the inductor 9. This occurs with some slip, depending upon the degree of excitation of coil 15.

Figure 4:
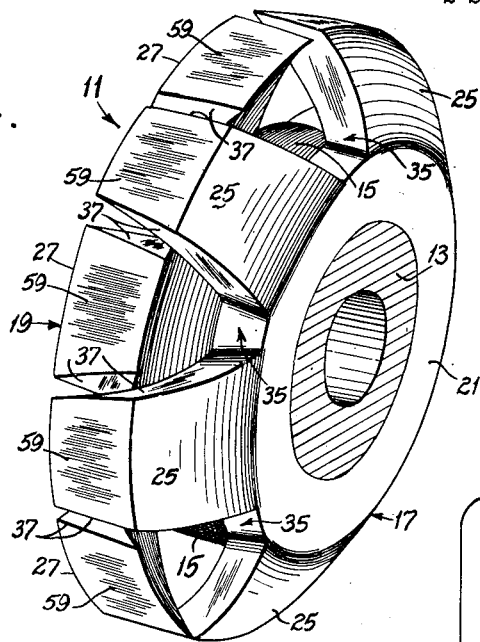
Fig. 4 is a perspective view of the field member of Fig. 1 removed from the machine.

From the above it will be seen that initially each spider 17 and 19 is stamped flat from flat sheet stock. At this time the V-shaped notches between poles are formed and these are numbered 35. They retain this V shape after bending over the teeth as indicated in Figs. 2 and 4. The sides of the teeth 25 and 27 are trimmed to a bevel, as shown at 37 so that the developed pole faces 59 appear as symmetrical quadrilaterals (Fig. 3). Being oppositely related, adjacent edges 37 are parallel. This bevel feature also prevents interference between the poles 25 and 27 when the spiders 21 and 23 are brought into position flanking the coil 15.

As indicated in Fig. 1, an exemplary angle of bending of the poles is 45° with respect to a plane normal to the axis of shaft 1. It will be understood that bending operations of this nature are more or less accurate, depending upon the working qualities of the iron or steel used and the character of the press, so that in some instances the appearance of the poles may be slightly curved as shown in Fig. 7, wherein like numerals designate like parts, the pole teeth having been renumbered 25A and 27A. They are still bent essentially at a 45° angle.

By means of the above-described very easily made field structure flow several important advantages: first, the teeth 25 and 27, being tilted toward one another and overlapping, cause a tilt in the positions of the intervening V-shaped and beveled notches 35. This in the case of each spider 17 and 19 produces very large open spaces above the coil and between the teeth on a given spider, wherein there is nothing but air and no magnetic material. Only in the limited interdigitating region (triangular in cross section) of the pole faces 59 (Fig. 1) does the material of one set of poles in-fill the notches between the other set of poles. The result is an extreme reduction of cross leakage of flux between the poles. Moreover, the V-shaped notches 35, the bevels 37 and the peripheral machining cause the poles 25 and 27 to taper down in cross section proceeding from the respective pole ring 21 or 23. This taper is of such an amount that proceeding from a pole ring to the point where they triangularly overlap (see plane P), successive sections carry a substantially constant flux density cross leakage of flux being taken into account. On the other hand, beyond plane P at the overlap the perpendicular cross sections on a pole increase as presented to the flux as it curves into the inductor 9, even though the poles taper down at this point in what may be called a chisel shape. Thus by the process of machining the pole ends to the chisel-shapes, the flux density across any pole face 59 is less than the constant value through all other sections. This accomplishes two desirable results: first, reduction in magneto-motive force required to force the flux across the gap 29; and second, the magnetic attraction across the gap is less, thus reducing the pull-over force. This is in combination with the saving in weight accomplished by the tapering of the flat teeth from the pole rings which works every other section of the tooth at a constant flux density. The result is that fewer ampere turns may be used in the coil 15 for the production of the flux at a given capacity, and a much smaller gap 29 may be employed without rubbing caused by magnetic pull-over effects.

The present structure is to be distinguished from more complex ones for arriving at any comparable results which, however, require that the field spiders comparable to 17 and 19 be cast in order to produce the proper pole shapes. An advantage of the present invention is that the simple spider stamped and pressed from flat stock may be used to obtain the desired results, particularly in smaller machines, without the necessity for costly machining operations to duplicate the more complex shapes usually obtained by casting. However, it is possible to cast the spiders of the present invention if desired.

In Fig. 5 is shown a form of the invention in which a 30° bending angle is employed for the flat polar teeth. In Fig. 5, 13B represents the sleeve of the field member. Around this is located the field coil 15B, flanked by the pole rings 21B and 23B from which extend the bent tapering polar teeth 25B and 27B, overlapping in the triangular portion, as shown at 39, and having the pole faces 41. In this case the pole angle from a plane normal to the axis is 30°. This, other things being equal, results in a smaller area of the faces 41, but it is still larger than the cross-sectional area of the normal plane P through the pole 25B, thus resulting in a flux density through the pole faces 41 which is less than that through any other section of the pole. The plane P in Fig. 5 has the same significance as in Fig. 1.

In Fig. 6 is shown another form of the invention in which 13C represents the sleeve upon which a wider coil 15C is wound. The coil is flanked by pole rings 23C and 21C from which extend the bent flat poles 25C and 27C. In this case the poles are bent in a 60° angle in a plane normal to the axis. The result is a pole face 43. In this case the pole end area 43 is substantially larger than the cross section of the respective pole in plane P.

Fig. 8 is a chart of torque transmitted, plotted against the slip speed between the members 9 and 11. The middle curve A is characteristic of the construction shown in Figs. 1–4; the curve B is characteristic of the construction shown in Fig. 5; and curve C is characteristic of the construction shown in Fig. 6. The conclusion to be drawn from Fig. 8 is that the 45° angle used in connection with the Fig. 1 construction produces the flattest torque-speed curve after the knee of the curve has been passed; the 30° angle results in a rising torque-speed curve after the knee of the curve has been passed, but the knee is lower; and the 60° angle results in a falling torque-speed curve after the knee of the curve has been passed, but the knee is higher. These curves illustrate the fact that the ratio of the pole end area to the minimum right section at P controls the torque-speed characteristics. The explanation of this is that in the case of the small 30° angle of Fig. 5, the resulting small pole end area produces the greatest flux density from the pole end (although this is less than through section P) which results in increase in torque with increase in slip speed. In the case of the Fig. 6 construction, the pole end area is largest, resulting in minimum flux density. Curve A, corresponding to the Fig. 1 construction, is intermediate, as the 45° angle is intermediate between the 30° and 60° angles above discussed.

It is to be observed that in no event, in order to obtain the improvements specified herein, is the stated angle to be 90° or of that order, which would bring the poles flush down on the outside of the coil. The limits of 30° to 60° illustrated are those that cover practical cases.

It will be observed that if any of the pole rings shown in Figs. 1, 5 and 6 be separated further than shown, the pole end areas will become staggered. The result of such a construction would be a reduction in the torque at low speeds, as illustrated by the dotted curve shown in Fig. 8. This is mentioned to show that the construction can be adjusted to cases where a less sharp knee is desired in the torque-speed curve.

Certain definitive features of the invention are as follows: The central portions of the spiders 17 and 19 form end rings of rectangular cross section adjacent the ends of the coil 15. The bent polar teeth 25 and 27 are flat and lie generally within the confines of substantial cones. The flat polar teeth taper from the end rings by reason of the triangular notches. They are chisel-shaped at their small ends and overlap triangularly in axial section so as to present alternate pole end areas lying in an imaginary bounding cylinder around the field member. By reason of the small overlap, interpolar flux leakage is minimized, in view of the substantial triangular openings left between each pole end and the base portions of the interdigitating poles. Lastly the notches flare toward the coil, thus beveling the teeth for adjacent parallelism when interdigitated.

It will be noted (Fig. 1, for example) that because of the bevel or chisel-shaped pole ends, the thickness T of each polar tooth is less than the width of face W, and this is true also for the forms shown in Figs. 5, 6 and 7. This accounts for the decrease in flux density across the pole face in each case below what it is in the last section P of the pole and hence below what it is in any section between P and the pole ring 21. Each succeeding smaller pole section starting from the ring, by reason of some flux leakage ahead of it carries less flux but the flux densities are approximately the same out to plane P, the tapers of the teeth brought about by the V notches being designed to attain this end.

It will be understood that although the field member 11 is shown inside the inductor member 9, the invention may be carried out in a field member wherein the coil is outside of the inductor member with the teeth such as 25 and 27 facing inward, and that this would simply be an inversion. The point in this connection will be clear by noting the inverted type of construction shown in Patent 2,470,596.

Reference is hereby made under the provisions of Rule 78 to a related invention disclosed and claimed in the U. S. patent application of Martin P. Winther, Serial No. 192,942, for Magnetic Pole, filed October 30, 1950, now Patent No. 2,603,677.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A rotary field member for eddy-current clutches and the like comprising an annular field coil flanked by pole spiders each composed of flat bendable ferrous stock and comprising bent poles of constant thickness but having lengthwise tapers extending from the pole ring and having beveled ends which interdigitate and overlap with respect to the poles of the other spider, the tapers being of an amount to provide a substantially constant flux density throughout successive cross sections of the poles normal to the direction of flux therethrough starting from the pole ring and up to the points of overlap, the bevels providing triangular overlaps and cylindrically positioned pole faces, the areas of said pole faces being larger than the last section of the pole which is not overlapped so that the flux density through the pole face is less than the constant flux density in said successive sections, the angles of the poles from a plane normal to the axis of rotation being in the range from 30° to 60°.

2. A rotary field member for eddy-current clutches and the like comprising an annular field coil flanked by pole spiders each composed of a rectangular pole ring, angled laterally tapering poles of substantially constant thickness equal to that of the ring and having beveled ends which interdigitate and overlap with respect to the poles of the other spider, the tapers being of an amount to provide a substantially constant flux density throughout successive cross sections of the poles normal to the direction of flux therethrough starting from the pole ring and up to the points of overlap, the bevels providing triangular overlaps and cylindrically positioned pole faces, the areas of said pole faces being larger than the last section of the pole which is not overlapped, whereby flux density through the pole face is less than the constant flux density in said successive sections, the angles of the poles from a plane normal to the axis of rotation being in the range from 30° to 60°.

3. Apparatus made according to claim 2 wherein the spaces between poles flare in the direction of the coil, whereby the pole faces become non-rectangular but quadrilateral and have adjacent substantially parallel edges in said pole faces.

RALPH L. JAESCHKE.

REFERENCES CITED

The following references are of record in the file of this patent:

UNITED STATES PATENTS

| Number | Name | Date |
|---|---|---|
| 2,243,318 | Rawlings | May 27, 1941 |
| 2,301,424 | List | Nov. 10, 1942 |
| 2,484,138 | Winther | Oct. 11, 1949 |
| 2,519,449 | Findley | Aug. 22, 1950 |

FOREIGN PATENTS

| Number | Country | Date |
|---|---|---|
| 527,726 | Great Britain | Oct. 15, 1940 |